United States Patent
Munro et al.

[11] Patent Number: 5,979,769
[45] Date of Patent: Nov. 9, 1999

[54] COMBINATION RANGE LASER SCANNER UTILIZING PERIODIC RANGE SWITCHING

[75] Inventors: James F. Munro, Ontario; Chay La, Rochester, both of N.Y.

[73] Assignee: PSC Inc., Webster, N.Y.

[21] Appl. No.: 08/964,222

[22] Filed: Nov. 4, 1997

Related U.S. Application Data

[60] Provisional application No. 60/030,382, Nov. 5, 1996.

[51] Int. Cl.[6] .................................................. G06K 7/10
[52] U.S. Cl. ........................................... 235/472; 235/455
[58] Field of Search .................................... 235/472–455; G06K 7/10

[56] References Cited

U.S. PATENT DOCUMENTS

| | | | |
|---|---|---|---|
| 5,200,597 | 4/1993 | Eastman et al. | 235/455 |
| 5,744,790 | 4/1998 | Li | 235/472 |
| 5,786,585 | 1/1995 | Eastman et al. | 235/472 |
| 5,789,730 | 6/1996 | Rockstein et al. | 235/472 |
| 5,798,512 | 10/1996 | Krichever et al. | 235/472 |
| 5,798,516 | 5/1996 | Shreesha | 235/472 |

FOREIGN PATENT DOCUMENTS

| | | |
|---|---|---|
| 0480348 | 4/1992 | European Pat. Off. . |
| 0517958 | 12/1992 | European Pat. Off. . |
| 0652530 | 5/1995 | European Pat. Off. . |

*Primary Examiner*—Thien Minh Le
*Assistant Examiner*—Daniel S. Felten
*Attorney, Agent, or Firm*—Foley & Lardner

[57] ABSTRACT

A combination range optical scanner includes a short distance laser and a long distance laser. A scan mirror is oscillated by a motor and scans a beam from one of the two lasers across a field of view. A controller turns the two lasers on and off such that both a short distance scan and a long distance scan are automatically performed. The rate at which the controller turns the lasers on and off may be synchronized with the oscillation rate of the scan mirror. A collection mirror may include two facets, integrally formed therewith, where the two lasers are respectively directed toward the two facets.

9 Claims, 5 Drawing Sheets

COMBINATION RANGE LASER SCANNER UTILIZING PERIODIC RANGE SWITCHING

This application Claims the benefit of U.S. Provisional Application No. 60/030,382, filed on Nov. 5, 1996.

BACKGROUND OF THE INVENTION

1. Field of the Invention

The invention relates to optical scanners having more than one scanning range. More particularly, the invention relates to combination range scanners which automatically switch between respective scanning ranges.

2. Related Art

U.S. Pat. No. 5,200,597, issued Apr. 6, 1993 to Eastman et al., herein incorporated by reference, shows a portable scanner unit which utilizes a single laser diode assembly.

SUMMARY OF THE INVENTION

It is an object of the invention to provide a combination range laser scanner. Specifically, it is an object of the invention to provide a combination range laser scanner which provides an optimum spot size for at least two different scan ranges.

It is a further object of the invention to automatically scan at least two different scan ranges.

It is a further object of the invention to provide an appearance of coincidence of the respective scan beams over the entire scan range.

DETAILED DESCRIPTION OF THE PREFERRED EMBODIMENTS

Figure 1:
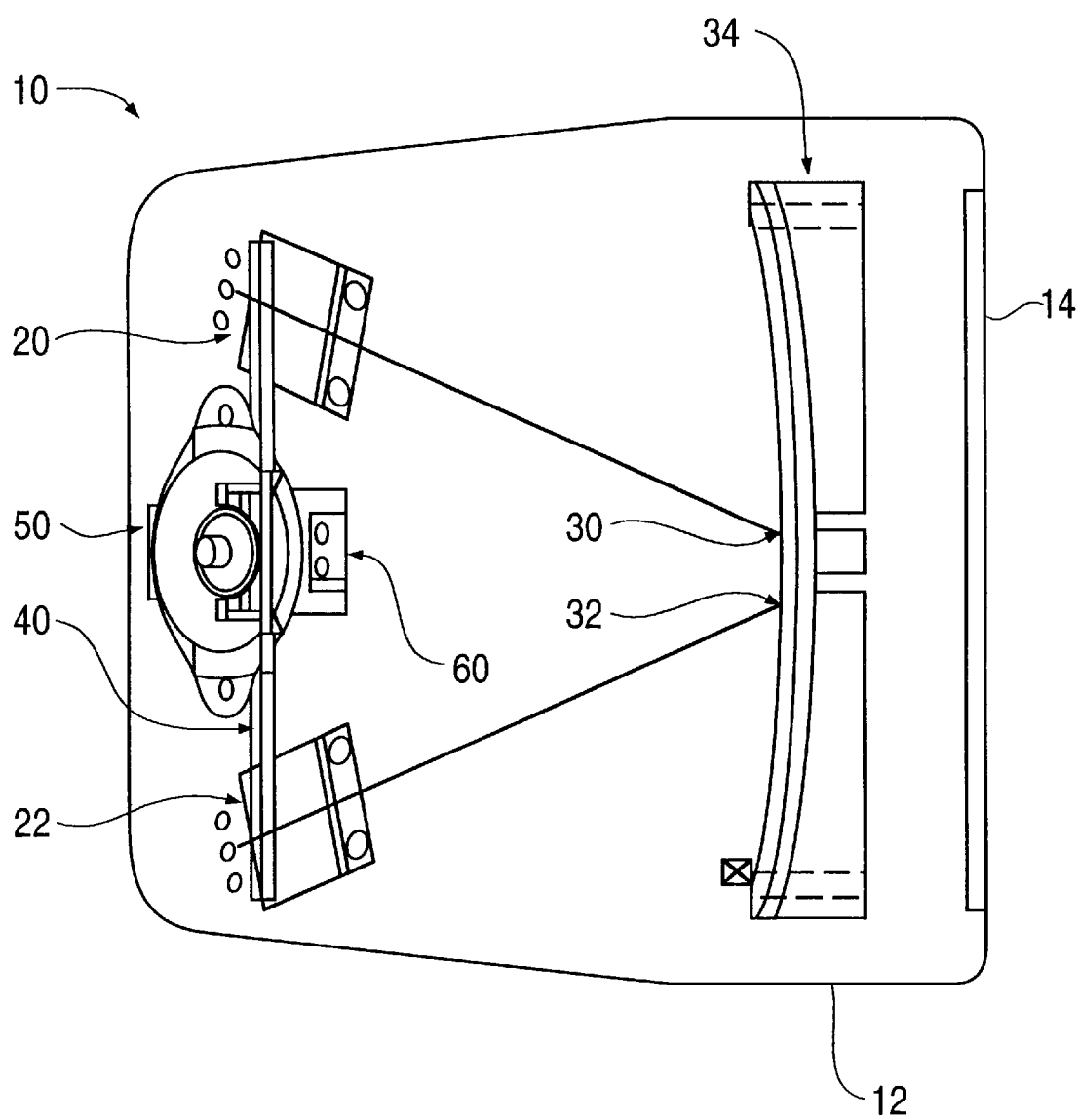
FIG. 1 is a top view of a combination range laser scanner according to a preferred embodiment of the invention.
Figure 2:
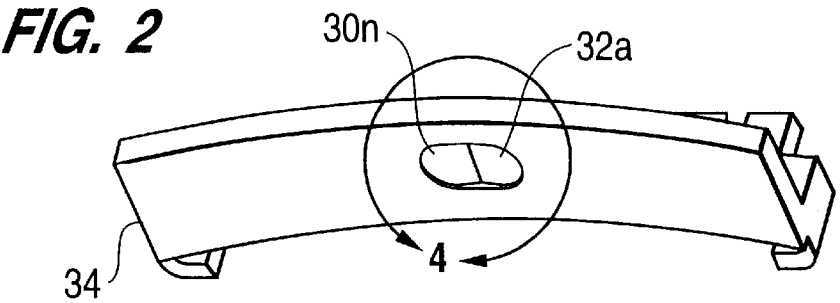
FIG. 2 is a perspective view of the front of a second embodiment of a collection mirror according to the invention.
Figure 3:
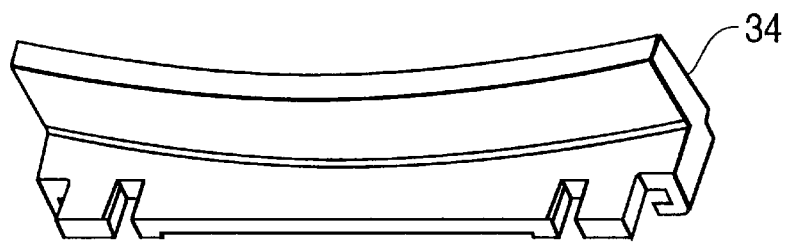
FIG. 3 is a perspective view of the back of the second embodiment of a collection mirror according to the invention.
Figure 4:
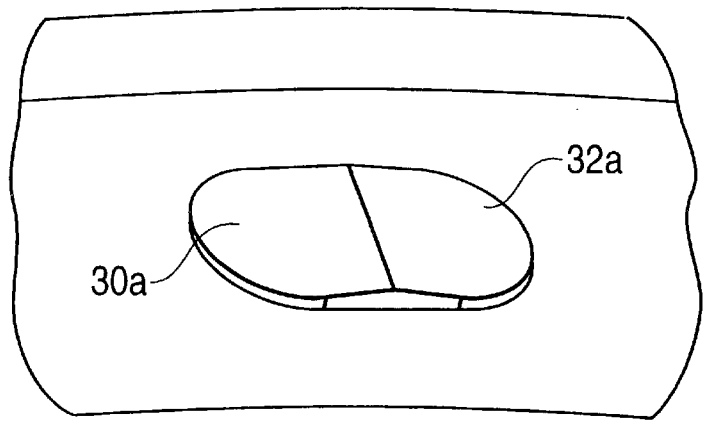
FIG. 4 is an enlarged view corresponding to the circled portion 4 from FIG. 2 showing details of the facets.
Figure 5:
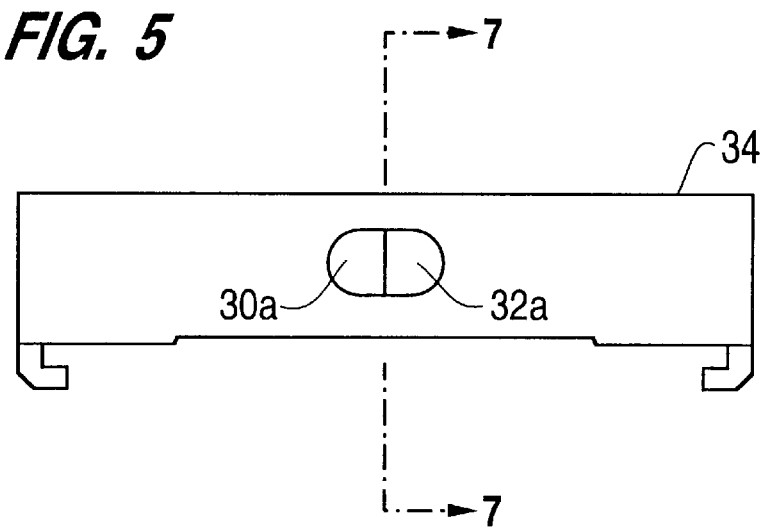
FIG. 5 is a front view of the second embodiment of a collection mirror according to the invention.
Figure 6:
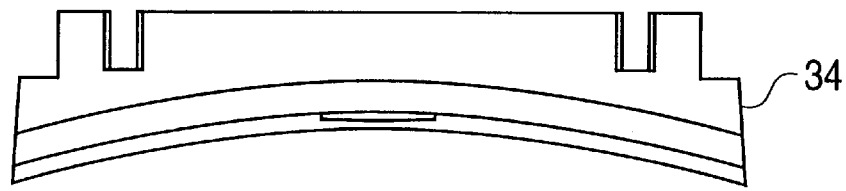
FIG. 6 is a top view of the second embodiment of a collection mirror according to the invention.
Figure 7:
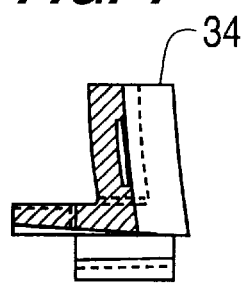
FIG. 7 is a sectional view of the second embodiment of a collection mirror according to the invention taken along section line 7—7 from FIG. 5.
Figure 8:
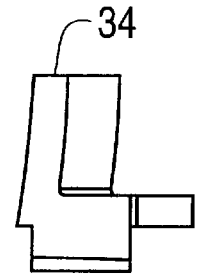
FIG. 8 is a side view of the second embodiment of a collection mirror according to the invention.

FIG. 1 shows a top view of a combination range laser scanner according to a preferred embodiment of the invention. A representative outline of a head portion 12 of the combination range laser scanner, indicated generally with reference numeral 10, is shown for purposes of illustration. The head unit can be integral with or attached to any suitable mount to form, for example, a fixed position scanner or a hand-held scanner. The combination range laser scanner 10 includes a window 14 in the head portion 12.

In the preferred embodiment shown in FIG. 1, two laser assemblies 20 and 22 generate respective scan beams. Each of laser assemblies 20 and 22 may include, for example, an aluminum housing, a light source, and a threaded brass nut containing a lens. Preferably, the wavelength of the respective light sources is the same and focusing of the laser assemblies 20 and 22 for different scan ranges is achieved via the lens. The lenses may be same or may have different characteristics. For example, the position of the lens may be adjusted, via the threaded brass nut, relative to the position of the light source in order to focus the light source, for example, to achieve an optimum spot size for a desired scan range. For example, the laser assembly 20 may be focused to function as a long distance laser with a spot size optimized for a scan range of, for example, 2 to 20 feet, while the laser assembly 22 may be focused to function as a short distance laser with a spot size optimized for a scan range of, for example, 0 (i.e. contact) to 2 feet.

FIG. 1 shows a first embodiment of a collection mirror 34 according to the invention with facets 30 and 32. The laser assemblies 20 and 22 are positioned to direct their respective scan beams toward facets 30 and 32, respectively. As shown in FIG. 1, the facet 30 is centered along the lengthwise axis of the collection mirror 34 and the facet 32 is offset from the facet 30. Preferably, facets 30 and 32 are formed integrally with an optical collection mirror 34. For example, the optical collection mirror 34 may be formed as a curved plastic structure with a reflective surface, and the facets 30 and 32 are formed as flat portions of the same structure. Alternatively, facets 30 and 32 may be separately formed flat reflective structures mounted elsewhere in the combination range laser scanner 10.

FIGS. 2–8 show a second embodiment of a collection mirror 34 according to the invention with facets 30a and 32a. As shown in FIGS. 2–8, the facets 30a and 32a are adjacent to each other and centered along the lengthwise axis of the collection mirror 34. Also preferably, facets 30a and 32a are arranged at respective angles which provide appropriate corresponding angles of reflection for laser assemblies 20 and 22, respectively.

Returning to FIG. 1, the combination range laser scanner 10 includes a scan mirror 40 positioned to receive the scan beams from the facets 30 and 32 and to direct the scan beams out through the window 14. The scan mirror 40 is coupled to a motor 50 for oscillatory movement of the scan mirror 40 in order to scan the scan beams across a field of view. A photodetector 60 is positioned to receive return light reflected from the collection mirror 34.

According to the invention, the laser assembly 20 is configured to scan a near field barcode and the laser assembly 22 is configured to scan a far field barcode. The laser assemblies 20 and 22 are alternately turned on and off, for example, in synchronization with the oscillation of the scan mirror 40, in order to automatically scan both near and far field barcodes. Preferably, the scan rate (i.e. the rate of oscillation of the scan mirror 40) is the same for scanning both near field and far field barcodes. A controller circuit, as hereinafter described, implemented, for example, in a microcontroller, controls the scan rate and the synchronization of the actuation of the laser assemblies therewith, and also provides signal processing of the signals from the photodetector 60 corresponding to the returned light.

Figure 9:
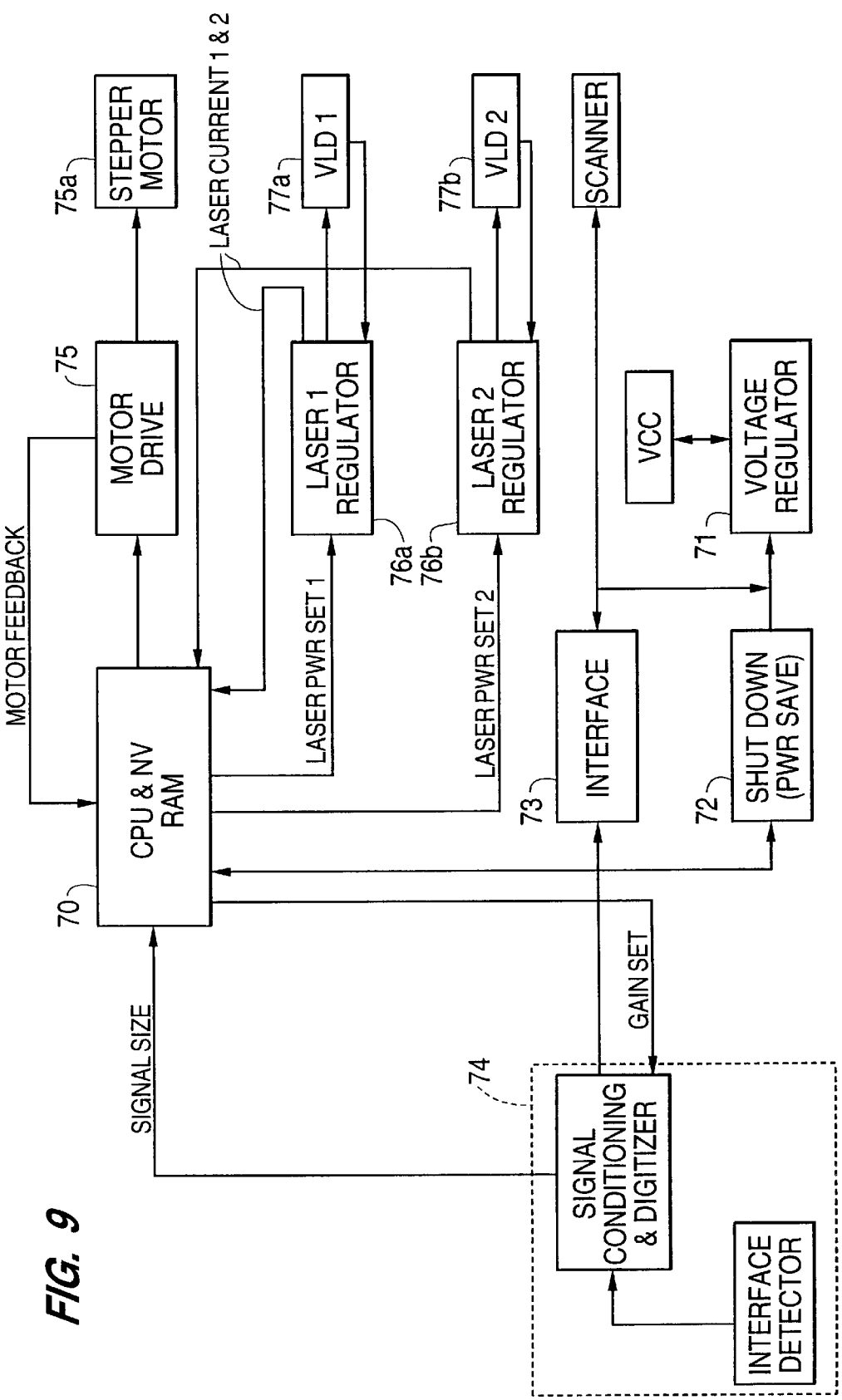
FIG. 9 is a block diagram of controller circuit for a combination range laser scanner according to the invention.

FIG. 9 is a block diagram of controller circuit for a combination range laser scanner according to the invention. A micro-controller 70 is coupled to various circuits to control operation of the scanner. The various circuits are described as follows.

A voltage regulator circuit 71 regulates the incoming power supply to vary from 4.5 to 14 volts. The voltage regulator circuit 71 in conjunction with a shut down circuit 72, controls the scanner's low power operation.

The shut down circuit 72 allows the micro-controller 70 to shut off its internal power supply in order to conserve power. The shut down circuit 72 applies power to the scanner's circuitry when it detects activity at the interface circuit 73. The shut down circuit further determines the stability of the regulated power and then releases a master reset signal for the micro-controller 70, thereby allowing the micro-controller 70 to execute program instructions.

The interface circuit 73 performs two functions: it protects CMOS circuitry in the scanner from electrostatic discharge (ESD) damage and provides various CMOS outputs with additional voltage and drive capability. The interface circuit 73 also contains logic for multiplexing several of the scanner's interface signals.

A detector and signal conditioning circuit 74 includes various sections: a light to current converter (i.e. the photodetector 60), a variable gain amplifier, a digitizer circuit, and a signal size detector. As the scanning mirror 40 moves one of the respective laser beams across the bar code target, the photodetector 60 converts the reflected light from the bar code to a time varying current. The variable gain amplifier amplifies the current and converts it to a digital signal with states (i.e. high and low) that represent the white and black regions of the bar code target. During each frame, the signal size detector of the signal and conditioning circuit 74 provides the micro-controller 70 with a signal proportional to the relative size of the analog bar code amplitude. The micro-controller 70 then adjusts the gain of the variable gain amplifier in accordance with the signal size.

The micro-controller 70 and the detector and signal conditioning circuit 74 form a closed loop feedback system. This system ensures optimum operation of the digitizer by maintaining the constant entry of the signal amplitude into the digitizer over the range of the scanner. The digitized bar code signal is provided to the interface circuit 73 for polarity selection.

A motor drive circuit 75 includes two identical power amplifier stages which connect a two phase, bipolar stepper motor 75a to the micro-controller 70. The micro-=controller 70 controls application of current to the motor, via the two power amplifier stages, as determined by a velocity feedback circuit signal from the motor drive circuit 75. Preferably, the current is varied through the motor coils in an analog manner to produce a desired angular velocity, a pulse width modulator (PWM) scheme is used to generate the required control.

Laser regulator circuits 76a and 76b regulate the optical power of visible laser diodes (VLDs) 77a and 77b, respectively, by forming a closed loop feedback system therewith. The micro-controller 70 controls the actuation of the VLDs 77a and 77b, as hereinafter described. The micro-controller 70 also provides a set point voltage proportional to the desired laser power for each of the VLDs 77a and 77b. The set point voltage is compared to the laser's monitored voltage (indirectly from the laser monitor current). The difference between the two voltages is amplified to provide the laser drive current. The laser regulator circuits 76a and 76b ensure that the VLDs 77a and 77b optical power remains constant independent of temperature. Preferably, the desired optical power is established during factory calibration of the scanner.

The laser regulator circuit 76a and 76b also provide respective signals to the micro-controller 70 which are proportional to the VLDs 77a and 77b laser operating current. In the event that this current becomes excessive (in an overheated scanner, for example), the micro-controller 70 shuts off the VLD 77a or 77b, in accordance with the received signals, in order to prevent damage.

An exemplary operation of the combination range laser scanner 10 is as follows. An operator directs the scan beam towards an indicia (i.e. a barcode) to be scanned. The micro-controller provides a signal to turn on the laser assembly 20 and to turn off the laser assembly 22. A scan beam from the laser assembly 20 is directed to the facet 30 and thereafter is reflected to the scan mirror 40. The scan beam is then reflected off the scan mirror 40 and out through the window 14. The scan mirror 40 is oscillated by the motor 50 to scan the scan beam across a field of view. Light reflected from the indicia is returned through the window 14 and reflected from the scan mirror 40 towards the collection mirror 34. The photodetector 60 receives the returned light from the collection mirror 34 and generates a signal which represents the scanned indicia. The scan beam from the laser assembly 20 is provided for a pre-determined number of oscillations of the scan mirror 40, which may be, for example, one (1) oscillation during which the scan mirror 40 begins at a first position, moves toward a second position and returns from the second position to the first position. Other numbers of oscillations and switching patterns may also be used. For example, the micro-controller 70 may turn the laser assemblies 20 and 22 on and off in accordance with a timer or clock signal which, for example, becomes active every quarter of a second (0.25 seconds).

Thereafter, the micro-controller provides a signal to turn on the laser assembly 22 and to turn off the laser assembly 20. A scan beam from the laser assembly 22 is directed to the facet 32 and thereafter is reflected to the scan mirror 40. The scan beam is then reflected out through the window 14. The scan mirror 40 is oscillated by the motor 50 to scan the scan beam across a field of view. Light reflected from the indicia is returned through the window 14 and reflected from the scan mirror 40 towards the collection mirror 34. The photodetector 60 receives the returned light from the collection mirror 34 and generates a signal which represents the scanned indicia. The scan beam from the laser assembly 22 is provided for a pre-determined number of oscillations of the scan mirror 40, which may be, for example, one (1) oscillation.

According to one aspect of the invention, the rate at which the micro-controller turns the laser assemblies 20 and 22 on and off is synchronized with the oscillation rate of the scan mirror 40. For example, the micro-controller may provide motor control signals to the motor 50 which control the rate at which the scan mirror 40 oscillates. In this example, the micro-controller provides the actuation signals to the laser assemblies 20 and 22 in accordance with the motor control signals in order to achieve synchronization with the oscillation rate of the scan mirror 40.

In another example, the micro-controller may receive signals from the motor 50 indicative of the rate of oscillation of the scan mirror 40. In this example, the micro-controller processes the received signals and provides the actuation signals to the laser assemblies 20 and 22 in accordance with the processed signals in order to achieve synchronization with the oscillation rate of the scan mirror 40.

As described above, the operation of the combination range laser scanner according to the invention is greatly simplified because the user simply points the scanner at the target symbol without regard for the scan range. The scanner automatically scans both near and far field ranges within a few cycles of the scan mirror oscillation. The foregoing is accomplished without manual user intervention and without complex circuitry performing range-finding functions.

Another aspect of the invention relates to the relative positioning of the respective scan beams. Preferably, the scan beams are adjusted in order to appear coincident to the user. In other words, the long distance scan pattern should scan along substantially the same scan line as the short distance scan pattern. For example, without proper adjustment, the user may perceive two separate scan lines (i.e. one scan line corresponding to the short distance laser and the other scan line corresponding to the long distance laser). According to this aspect of the invention, the relative position and alignment of the laser assemblies 20 and 22 are adjusted in order to achieve the appearance of coincidence of the respective scan beams.

Figure 10:
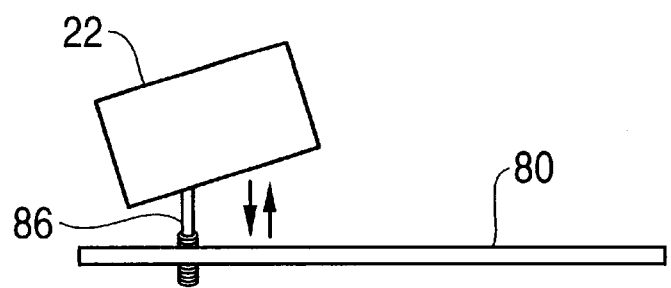
FIG. 10 is a side view of a first embodiment of an adjustable laser assembly according to the invention.

FIG. 10 is a side view of a first embodiment of an adjustable laser assembly according to the invention. According to this embodiment, the angle of the laser assemblies 20 and 22 is fixed and one or both of the laser assemblies 20 and 22 may be vertically adjusted in order to achieve the desired coincidence of the scan beams. FIG. 10 shows the laser assembly 22 mounted on a mounting surface 80 which may be, for example, a printed circuit board. The mounting surface 80 is formed to have an opening for engaging a vertically adjustable post 82. For example, the vertically adjustable post 82 may include a threaded portion which may be rotated to achieve a desired vertical position.

Figure 11:
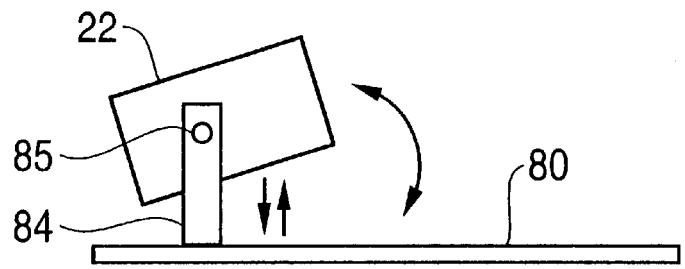
FIG. 11 is a side view of a second embodiment of an adjustable laser assembly according to the invention.

FIG. 11 is a side view of a second embodiment of an adjustable laser assembly according to the invention. According to this embodiment, the height of the laser assemblies 20 and 22 is fixed and one or both of laser assemblies 20 and 22 may be angularly adjusted in order to achieve the desired coincidence of the scan beams. FIG. 11 shows a the laser assembly 22 mounted on the mounting surface 80. One end of a post 84 is attached to the mounting surface 80. The post 84 is pivotally attached to the laser assembly 22 at a pivot point 85. The laser assembly 22 may rotated about the pivot point 85 to adjust the angle of reflection with respect to the facet 32 and thereby achieve the desired coincidence of the respective scan beams.

Figure 12:
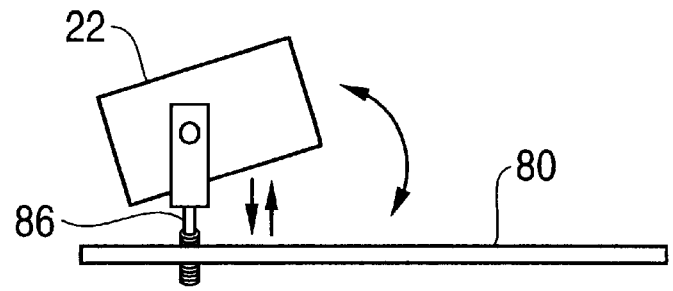
FIG. 12 is a side view of a third embodiment of an adjustable laser assembly according to the invention.

FIG. 12 is a side view of a third embodiment of an adjustable laser assembly according to the invention. According to this embodiment, both the angle and height of one or both of laser assemblies 20 and 22 adjusted in order to achieve the desired coincidence of the scan beams. One skilled in the art will appreciate that other structures may be used in place of or in addition to those described with respect to FIGS. 10–12 to position of the laser assemblies 20 and 22 in order to achieve the desired coincidence of the respective scan beams.

One skilled in the art will appreciate that more than two laser assemblies with respective scan ranges may utilized in the combination range laser scanner according to the invention. Moreover, while the invention has been described with respect to specific embodiments, one skilled in the art will appreciate that other embodiments are possible without departing from the scope of the invention.

What is claimed is:

1. A combination range optical scanner comprising:
    a first laser assembly for generating a first scan beam to scan a first range, said first scan beam being generated in accordance with a first control signal;
    a second laser assembly for generating a second scan beam to scan a second range, said second scan beam being generated in accordance with a second control signal;
    an oscillating scan mirror for scanning a received scan beam across a field of view, said oscillating scan mirror being positioned to receive said first and second scan beams;
    a controller for periodically providing said first and second control signals;
    a collection mirror for collecting returned light corresponding to a scanned indicia; and
    a photodetector for receiving collected return light form said collection mirror and producing an output signal representing said scanned indicia;
    wherein said collection mirror comprises a first facet and a second facet, and wherein said first scan beam is directed toward said first facet and said second scan beam is directed toward said second facet.

2. A combination range optical scanner according to claim 1, wherein a first rate at which said controller periodically provides said first and second control signals is synchronized with a second rate at which said oscillating scan mirror oscillates.

3. A combination range optical scanner according to claim 1, wherein said first and second facets and said collection mirror are formed as one piece.

4. A combination range optical scanner according to claim 1, wherein relative position and alignment of the first and second laser assemblies are adjusted to generate scan patterns along substantially the same scan line.

5. A combination range optical scanner according to claim 1, wherein said first laser assembly and said second laser assembly include respective first and second lenses that focus the first and second scan beams at said first and second ranges, respectively.

6. A combination range optical scanner according to claim 1, wherein said first and second scan beams have the same wavelength.

7. A combination range optical scanner according to claim 1, wherein said first and second ranges are scanned at the same rate.

8. A combination range optical scanner according to claim 1, wherein said controller turns said first and second laser assemblies on and off in synchronism with an oscillator rate of the scan mirror.

9. A combination range optical scanner according to claim 8, wherein said scan mirror is oscillated by a motor, said motor providing signals to said controller that is indicative of the oscillator rate of said scan mirror.

* * * * *